United States Patent [19]

Morimoto et al.

[11] Patent Number: 5,009,127

[45] Date of Patent: Apr. 23, 1991

[54] TRANSMISSION RATIO CONTROL SYSTEM FOR A CONTINUOUSLY VARIABLE TRANSMISSION

[75] Inventors: Yoshihiko Morimoto, Mitaka; Tetsushi Kohno, Musashino, both of Japan

[73] Assignee: Fuji Jukogyo Kabushiki Kaisha, Tokyo, Japan

[21] Appl. No.: 418,188

[22] Filed: Oct. 6, 1989

[30] Foreign Application Priority Data

Oct. 14, 1988 [JP] Japan .................... 63-260185

[51] Int. Cl.⁵ .................................... B60K 41/14
[52] U.S. Cl. ........................... 74/866; 474/18; 364/424.1; 74/867
[58] Field of Search ............... 74/866, 867; 474/12, 474/18, 28; 364/424.1

[56] References Cited

U.S. PATENT DOCUMENTS

| | | | |
|---|---|---|---|
| 4,782,934 | 11/1988 | Takano et al. | 74/866 X |
| 4,784,021 | 11/1988 | Morimoto | 74/868 |
| 4,794,819 | 1/1989 | Tanaka et al. | 74/866 |
| 4,827,803 | 5/1989 | Miyawaki | 74/866 |
| 4,843,913 | 7/1989 | Miyawaki | 74/866 X |
| 4,850,935 | 7/1989 | Morimoto | 474/18 |
| 4,909,103 | 3/1990 | Morimoto | 74/867 X |

FOREIGN PATENT DOCUMENTS

258004  3/1988  European Pat. Off. ........... 74/866
60-98251 6/1985  Japan .

Primary Examiner—Allan D. Herrmann
Assistant Examiner—Benjamin Levi
Attorney, Agent, or Firm—Martin A. Farber

[57] ABSTRACT

A control system for a continuously variable transmission for a motor vehicle has a transmission ratio control valve for controlling the transmission ratio. The transmission ratio is controlled in accordance with a transmission ratio changing speed. The transmission ratio changing speed is corrected with a coefficient which is determined in accordance with desired transmission ratio changing speed and the difference between desired transmission ratio and actual transmission ratio.

3 Claims, 5 Drawing Sheets

TRANSMISSION RATIO CONTROL SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for controlling the transmission ratio of the transmission at acceleration.

A known control system for a continuously variable belt-drive transmission has an endless belt running over a drive pulley and a driven pulley. Each pulley comprises a hydraulically shiftable conical disc which is axially shifted by a fluid operated servo device so as to vary the running diameter of the belt on the pulleys in dependency on driving conditions. The system is provided with a line pressure control valve and a transmission ratio control valve. Each valve has a spool to control the oil supplied to the servo devices The transmission ratio control valve operates to determine the transmission ratio in accordance with the opening degree of a throttle valve of an engine and the speed of the engine. The line pressure control valve is adapted to control the line pressure in accordance with the transmission ratio and the engine speed. The output of an engine is transmitted to the drive pulley through a clutch. The line pressure is controlled to prevent the belt from slipping on the pulleys in order to transmit the output of the engine.

At the start of the vehicle, the transmission ratio is set at a maximum value. When the vehicle speed and engine speed reach set values under a driving condition, the transmission ratio starts to change (decrease). The transmission ratio is controlled to a desired transmission ratio.

Japanese Patent Application Laid-Open 60-98251 discloses a control system where a plurality of desired engine speeds Ne' are determined in dependency on a throttle opening degree $\theta$. One of the desired speed Ne' is selected at the start and at the end of the acceleration, and the actual engine speed Ne is controlled to coincide with the selected desired speed in dependency on a speed rate e.

However, since the desired engine speed is selected in accordance with engine operating conditions such as the throttle opening degree and whether the vehicle is in a steady state or accelerating, convergence, of the actual engine speed to the desired speed is delayed. In addition, since the desired engine speed is selected from a plurality of stored speeds, the control system becomes complicated.

In order to resolve such problems, there has been proposed a control system where a transmission ratio changing speed (rate) di/dt is calculated in dependency on the difference id-i between the desired transmission ratio id and the transmission ratio i, and on a desired transmission ratio changing speed (rate) did/dt which is for compensating a delay in the hydraulic control operation. A shift quantity D of the spool of the transmission is obtained in accordance with the transmission ratio changing speed (rate) di/dt and the actual ratio i to control the transmission ratio.

Figure 5:
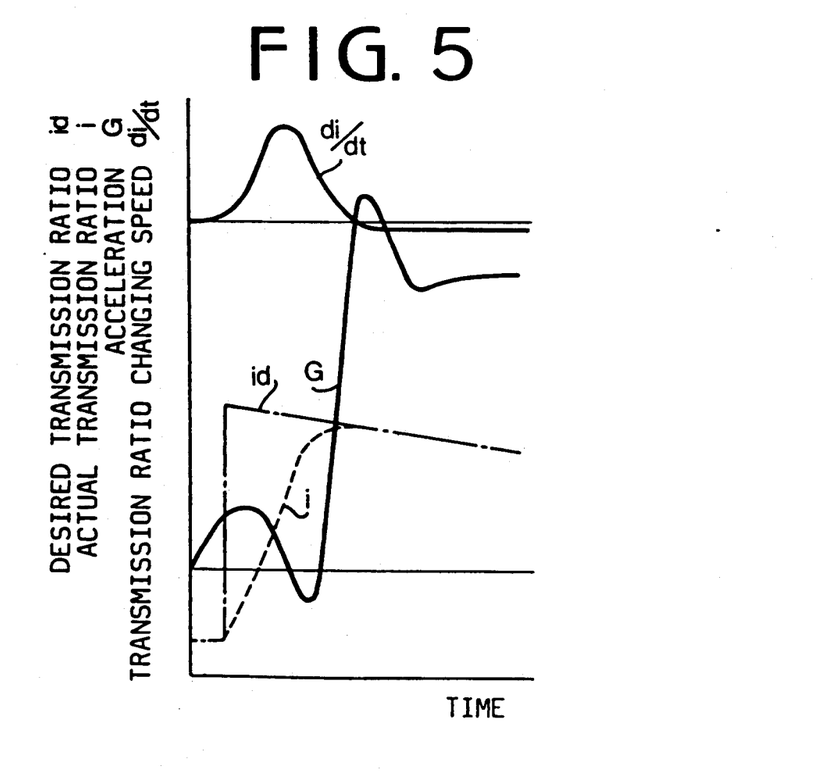
FIG. 5 is a graph showing characteristics of desired and actual transmission ratios, acceleration and transmission ratio changing speed.

Referring to FIG. 5, at acceleration, such as kickdown, the desired transmission ratio id rapidly increases. Accordingly, the actual transmission ratio i approaches the desired ratio id so that the transmission ratio is quickly decreasing. The desired transmission ratio id slowly decreases for decreasing the transmission ratio and the actual transmission ratio i converges toward the desired transmission ratio id while reducing the transmission ratio changing speed (rate). Thus, the transmission ratio is decreased.

However, during such an operation, the acceleration G largely, increases when the transmission ratio changes so as to decrease, which causes shock to the vehicle body.

SUMMARY OF THE INVENTION

The object of the present invention is to provide a system for controlling the transmission ratio where the transmission ratio is smoothly decreased after increasing at acceleration such as kickdown.

According to the present invention, there is provided a control system for a continuously variable transmission for transmitting the power of an engine mounted on a motor vehicle, the engine having a throttle valve, the transmission comprising a drive pulley having a hydraulically shiftable disc and a hydraulic cylinder for operating the disc, a driven pulley having a hydraulically shiftable disc and a hydraulic cylinder for operating the disc of the driven pulley, a belt engaged with both of the pulleys, the control system comprising a first hydraulic circuit having a pump for supplying oil to both the hydraulic cylinders, a transmission ratio control valve for controlling the oil supplied to the cylinder of the drive pulley to change the transmission ratio to a desired transmission ratio.

The system comprises transmission ratio control means for operating the transmission ratio control valve, a drive pulley speed sensor for producing a drive pulley speed signal, a driven pulley speed sensor for producing a driven pulley speed signal, a throttle position sensor for sensing the opening degree of the throttle valve and for producing a throttle opening degree signal, first calculator means responsive to the drive pulley speed signal and the driven pulley speed signal for producing an actual transmission ratio signal, means responsive to the throttle opening degree signal and to the actual transmission ratio signal for producing a desired transmission ratio signal, second calculator means responsive to the desired transmission ratio signal for producing a desired transmission ratio changing speed signal, third calculator means responsive to the actual transmission ratio signal and the desired transmission ratio signal for calculating the difference between both the ratio signals and for producing a ratio difference signal, coefficient setting means responsive to the desired transmission ratio changing speed signal and to the ratio difference signal for producing a correcting coefficient, correcting means for correcting the transmission ratio changing speed signal with the correcting coefficient, and driving means responsive to the corrected transmission ratio changing speed signal for operating the transmission ratio control means, for controlling the transmission ratio.

In an aspect of the invention, the correcting coefficient is an increasing function of the desired transmission ratio changing speed signal and an increasing function of the ratio difference signal.

The other objects and features of this invention will become understood from the following description with reference to the accompanying drawings.

DETAILED DESCRIPTION OF THE PREFERRED EMBODIMENT

Figure 1:
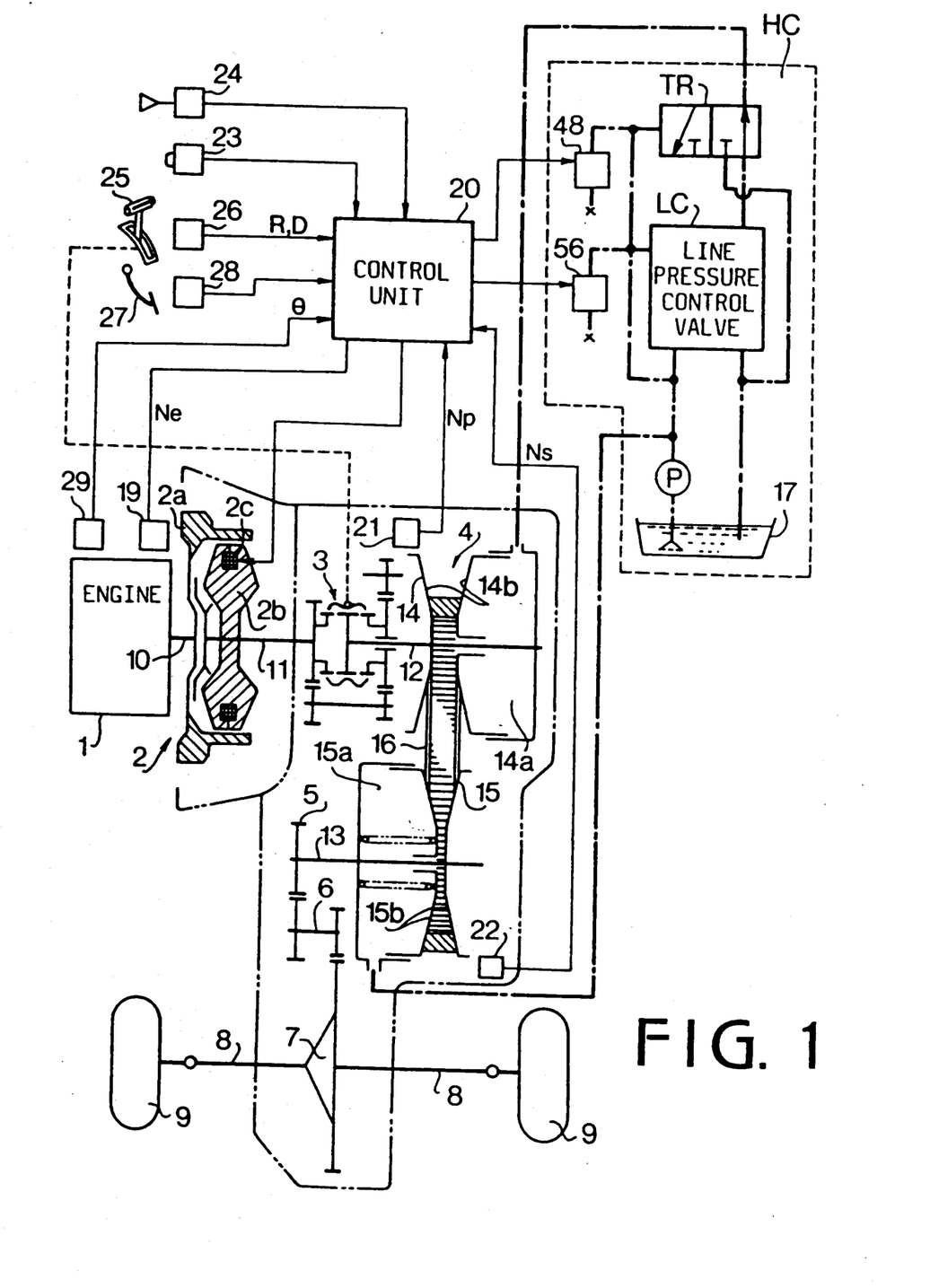
FIG. 1 is a schematic illustration of a continuously variable belt-drive transmission to which the present invention is applied.

Referring to FIG. 1, a crankshaft 10 of an engine 1 is operatively connected to an electromagnetic powder clutch 2 for transmitting the power of the engine 1 to a continuously variable belt-drive automatic transmission 4 through a selector mechanism 3. The output of the belt-drive transmission 4 is transmitted to axles 8 of vehicle driving wheels 9 through an output shaft 13, a pair of intermediate reduction gears 5, an intermediate shaft 6, and a differential 7.

The electromagnetic powder clutch 2 comprises an annular drive member 2a connected to crankshaft 10 of the engine 1, a driven member 2b secured to an input shaft 11 of the transmission 4, and a magnetizing coil 2c provided in the driven member 2b. Magnetic powder is provided in a gap between the drive member 2a and driven member 2b. When the magnetizing coil 2c is excited by the clutch current, driven member 2b is magnetized to produce a magnetic flux passing through the drive member 2a. The magnetic powder is aggregated in the gap by the magnetic flux and the driven member 2b is engaged with the drive member 2a by the powder. On the other hand, when the clutch current is cut off, the drive and driven members 2a and 2b are disengaged from one another.

In the belt-drive transmission 4, the selector mechanism 3 is provided between the input shaft 11 and a main shaft 12. The selector mechanism 3 is provided with a synchromesh mechanism comprising gears, hub, and sleeve for connecting the input shaft 11 and the main shaft 12 to selectively provide a driving position (D) and a reverse driving position (R).

The continuously variable belt-drive automatic transmission 4 has the main shaft 12 and the output shaft 13 provided in parallel with the main shaft 12. A drive pulley 14 provided with a pair of discs 14b and a hydraulic cylinder 14a is mounted on the main shaft 12. A driven pulley 15 provided with a pair of discs 15b and a hydraulic cylinder 15a is mounted on the output shaft 13. A drive belt 16 engages with the drive pulley 14 and the driven pulley 15. The hydraulic cylinders 14a and 15a are communicated with an oil hydraulic control circuit HC. The cylinder 14a is supplied with pressurized oil by an oil pump P from an oil reservoir 17 passing through a line pressure control valve LC and a transmission ratio control valve TR. The cylinder 15a is applied with pressurized oil from the pump P. The hydraulic control circuit is responsive to vehicle speed, engine speed and throttle valve position for controlling the amount of oil supplied to the cylinders 14a and 15a.

The pulleys 14 and 15 are operated by the compressive forces of the cylinders so that the running diameter of the belt 16 varies to infinitely change the transmission ratio.

An electronic control system for the clutch 2 and the belt-drive transmission 4 has an engine speed sensor 19, and rotating speed sensors 21 and 22 for respectively sensing rotating speeds of drive pulley 14 and the driven pulley 15. A choke switch 24 produces an output signal when a choke valve of the engine 1 is closed, and an air conditioner switch 23 produces an output signal at the operation of an air conditioner. A selector lever 25 connected to the selector mechanism 3 is provided with a select position sensor 26 for sensing a driving position (D), neutral position (N) and reverse position (R).

An accelerator pedal switch 28 is provided for sensing the depression of an accelerator pedal 27, and a throttle position sensor 29 is provided.

Output signals of the sensors and the switches are applied to an electronic control unit 20 which produces a clutch current control signal for the clutch 2 and a control signal for controlling the transmission ratio (i) and a line pressure control signal for the control circuit HC.

Figure 2A:
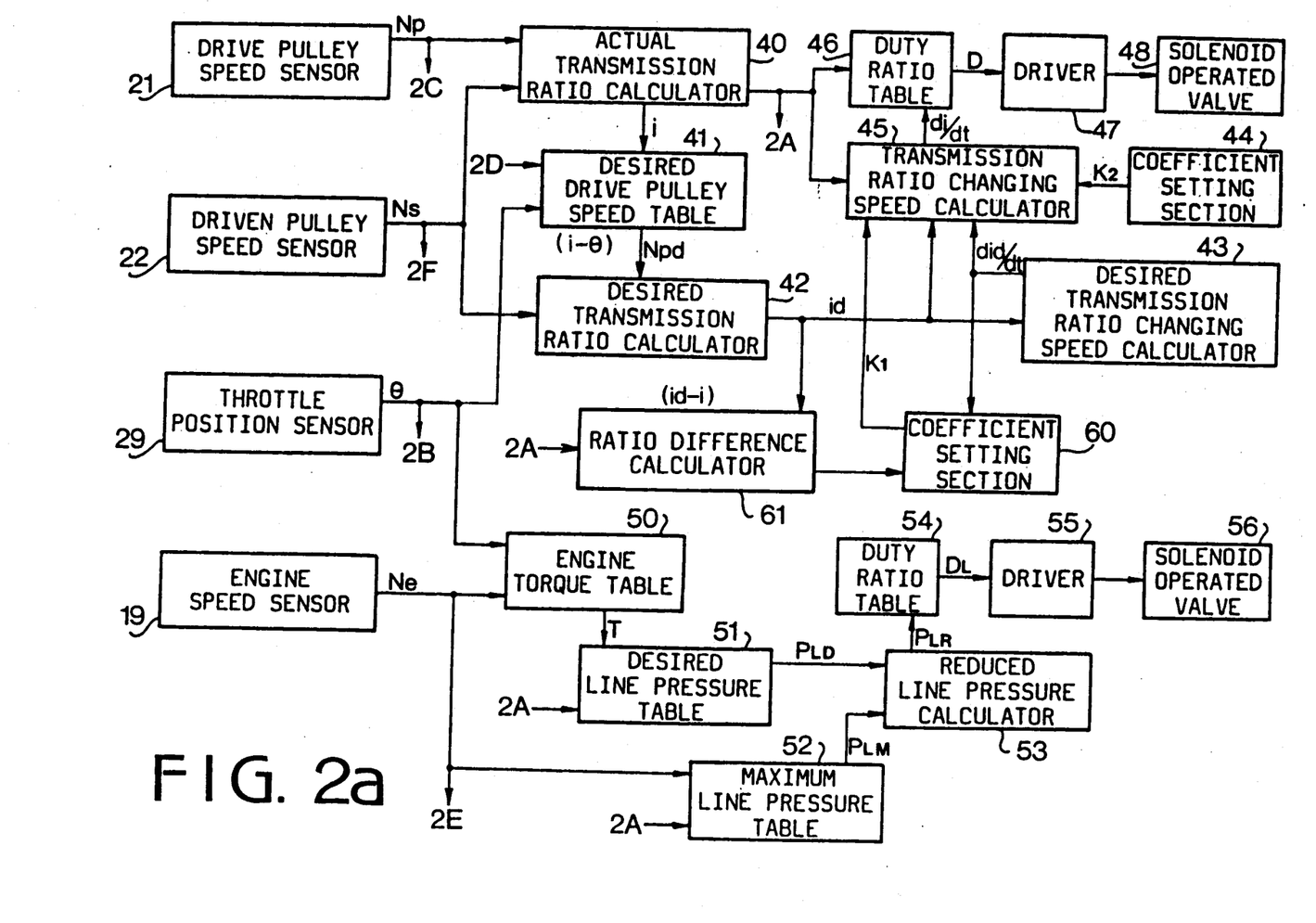
FIGS. 2a and 2b show a block diagram of a control unit according to the present invention.
Figure 2B:
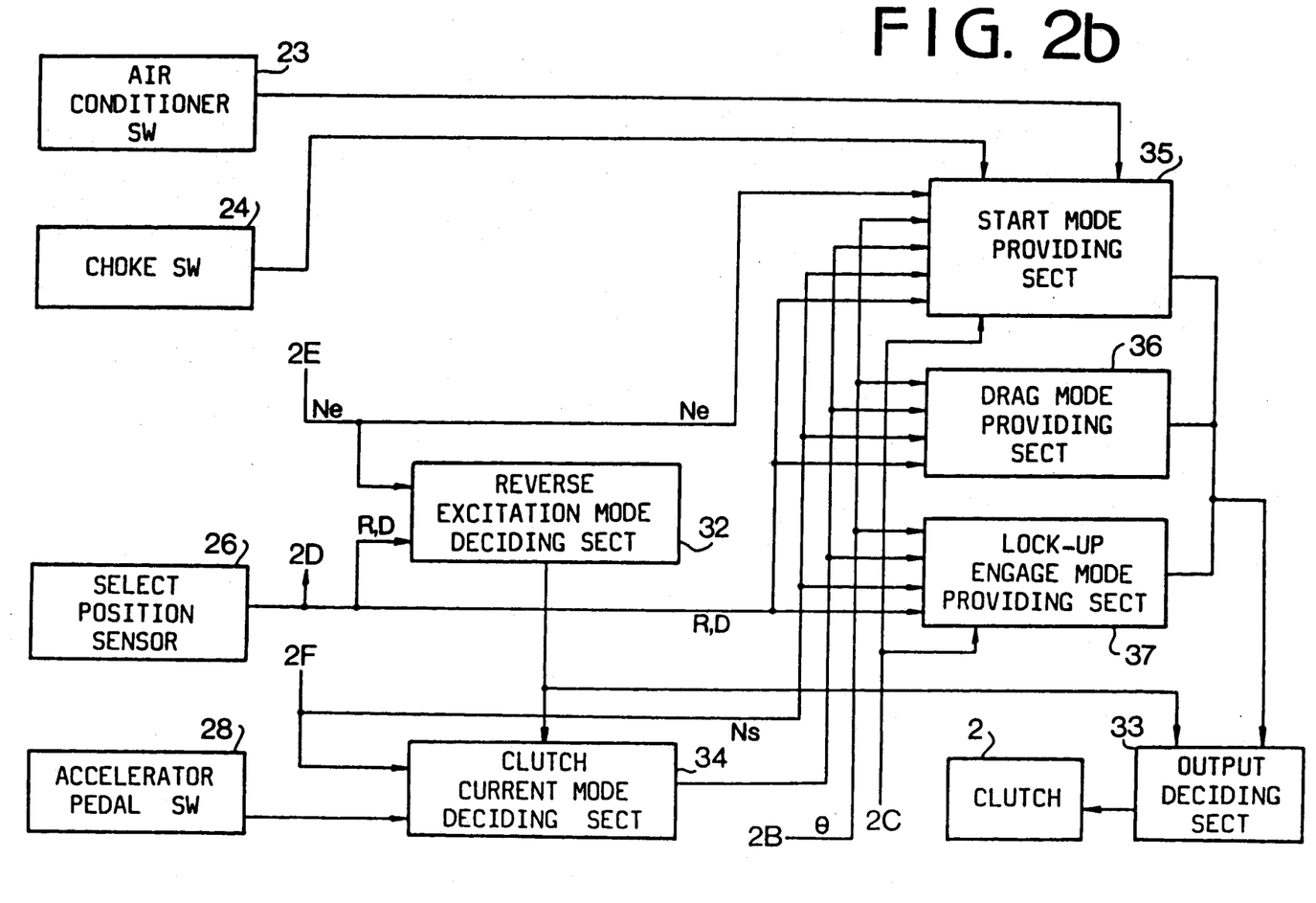

Referring to FIGS. 2a and 2b showing the control unit 20 of FIG. 1, a reverse excitation mode deciding section 32 is applied with engine speed signal Ne of the sensor 19 and drive position signal of the select position sensor 26. When the engine speed Ne is below 300 rpm, or the selector lever 25 is at the neutral position (N) or a parking position (P), the reverse excitation mode deciding section 32 produces a reverse excitation signal which is applied to an output deciding section 33, so that a small reverse current flows in the clutch 2 to release the clutch completely.

A clutch current mode deciding section 34 is applied with signals from the reverse excitation mode deciding section 32 and accelerator pedal switch 28, and vehicle speed signal V from driven pulley speed sensor 22 for deciding driving conditions such as a starting mode to produce output signals. The output signals are applied to a start mode providing section 35, drag mode providing section 36, and clutch lock-up engage mode providing section 37.

The start mode providing section 35 decides clutch current of a starting characteristic dependent on the engine speed Ne at ordinary start or at the closing of the choke switch 24 or the closing of the air conditioner switch 23. The starting characteristic is corrected by signals from the throttle valve opening degree $\theta$, vehicle speed V, and driving positions (D), (DS) or (R).

The drag mode providing section 36 decides a small drag current for providing a drag torque to the clutch 2 for the reduction of clearances formed in the transmission and for the smooth start of the vehicle when the accelerator pedal 27 is released at a low speed in the driving position and the reverse position.

The clutch lock-up engage mode providing section 37 decides a lock-up current in response to the vehicle speed V and throttle opening degree $\theta$ at the driving position and reverse position for completely engaging the clutch 2. Outputs of sections 35, 36 and 37 are applied to the output deciding section 33 to control the clutch current.

A system for controlling the transmission ratio and the line pressure will now be described. Output signals $N_P$ and $N_S$ of the sensors 21, 22 are fed to an actual transmission ratio calculator 40 to produce an actual transmission ratio i in accordance with $i = N_P/N_S$. The actual transmission ratio i and output signal $\theta$ of the throttle position sensor 29 are fed to a desired drive pulley speed table 41 to derive a desired drive pulley speed Npd in accordance with values of the transmission ratio r and signal $\theta$. The desired drive pulley speed Npd and the driven pulley speed Ns are fed to a desired transmission ratio calculator 42 to calculate a desired transmission ratio id in accordance with the speeds Npd and Ns which corresponds to vehicle speed.

Figure 3:
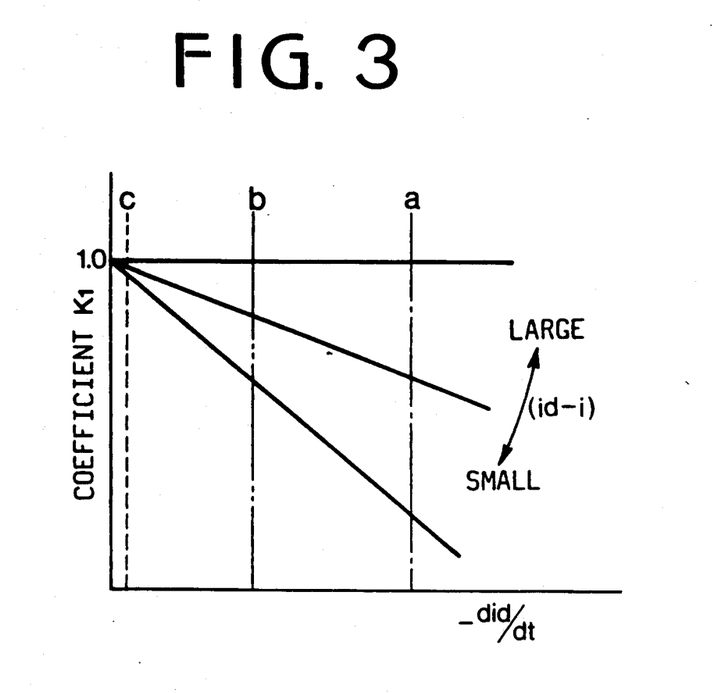
FIG. 3 is a graph showing characteristics of a coefficient K1 relative to the difference between actual and desired transmission ratios and to desired transmission ratio changing speed.

The desired transmission ratio id is fed to a desired transmission ratio changing speed calculator 43 which produces a desired transmission ratio changing speed (rate) did/dt. The speed (rate) did/dt is the amount of change of the desired transmission ratio id during a predetermined time interval In accordance with the present invention, the actual transmission ratio i and the desired transmission ratio id are fed to a ratio difference calculator 61 where the difference between the actual and desired ratios i, id is calculated. The difference id-i is applied to a coefficient setting section 60 to which the desired transmission ratio changing speed (rate) did/dt is fed to obtain a coefficient K1. As shown in FIG. 3, the coefficient K1 is an increasing function of the difference id-i and of desired transmission ratio changing speed did/dt. The desired transmission ratio changing speed (rate) did/dt has a negative value when the transmission is upshifted.

A coefficient setting section 44 is provided for producing a coefficient K2. The actual transmission ratio i, desired transmission ratio id, desired transmission ratio changing speed (rate) did/dt and coefficients K1 and K2 are applied to a transmission ratio changing speed calculator 45 to produce a transmission ratio changing speed di/dt from the following formula.

$$di/dt = K1\ (id-i) + K2 \cdot did/dt$$

In the formula, the term of (id−i) is a control quantity dependent on the difference between the desired and actual transmission ratios and did/dt is a term for advancing the delay in phase caused by a first order lag in the system.

The speed (rate) di/dt and actual ratio i are applied to a duty ratio table 46 to derive a duty ratio D in accordance with $D = f\ (di/dt, i)$ using a table at upshift and downshift of the transmission. The duty ratio D is supplied to a solenoid operated on-off valve 48 through a driver 47. The valve 48 is provided in the hydraulic circuit HC, for shifting a spool of the transmission ratio control valve TR to control the transmission ratio.

On the other hand, engine speed Ne from the engine speed sensor 19 and throttle opening degree $\theta$ from the throttle position sensor 29 are applied to an engine torque table 50 to derive an engine torque T. The engine torque T and the actual transmission ratio i from the calculator 40 is applied to a desired line pressure table 51 to derive a desired line pressure $P_{LD}$.

In a hydraulic circuit of the control system, oil pressure discharged from the pump varies in accordance with the change of the engine speed Ne, so that a maximum line pressure $P_{LM}$ also varies. In order to detect the variance of the maximum line pressure $P_{LM}$, the control unit is provided with a maximum line pressure table 52 to which the engine speed Ne and the actual transmission ratio i are supplied. Therefore, the maximum line pressure $P_{LM}$ is obtained.

The desired line pressure $P_{LD}$ and the maximum line pressure $P_{LM}$ are applied to a reduced line pressure calculator 53 wherein a reduced line pressure $P_{LR}$ is calculated based on the proportion of the desired line pressure $P_{LD}$ to the maximum line pressure $P_{LM}$. The reduced line pressure $P_{LR}$ is applied to a duty ratio table 54 to derive a duty ratio $D_L$ corresponding to the reduced line pressure $P_{LR}$. The duty ratio $D_L$ is supplied to driver 55 which operates a solenoid operated on-off valve 56 at the duty ratio. The valve 56 is provided in the hydraulic circuit for shifting a spool of the line pressure control valve LC to control the line pressure In operation, while the vehicle stops, cylinder 15a of the driven pulley 15 is supplied with line pressure, and the cylinder 14a of the drive pulley 14 is drained, since $N_P$, $N_s$, and $\theta$ are zero and the duty ratio D is zero. Thus, in the pulley and belt device of the continuously variable belt-drive transmission, the drive belt 16 engages with the driven pulley 15 at a maximum running diameter to provide the largest transmission ratio (low speed stage).

When the accelerator pedal 27 is depressed, the clutch current increases progressively with increase of engine speed. The electromagnetic clutch 2 is gradually engaged, transmitting the engine power to the drive pulley 14. The power of the engine is transmitted to the output shaft 13 at the largest transmission ratio by the drive belt 16 and driven pulley 15, and further transmitted to axles of the driving wheels 9. Thus, the vehicle is started. When the vehicle speed (output signal N ) exceeds a predetermined value, the clutch 2 is completely engaged.

When the throttle valve is opened for acceleration of the vehicle, the desired transmission ratio id is calculated at the calculator 42 based on the desired drive pulley speed derived from the table 41 and on the driven pulley speed $N_s$. Further, the desired transmission ratio changing speed (rate) did/dt and transmission ratio changes speed (rate) di/dt are calculated at calculators 43 and 45 based on the actual transmission ratio i, desired transmission ratio id and coefficients $K_1$ and $K_2$. The transmission ratio changing speed (rate) di/dt is fed to the duty ratio table 46, so that duty ratio D for valve 48 is obtained from the table 46.

When the accelerator pedal is released, the transmission ratio changing speed (rate) di/dt becomes negative Accordingly the value of the duty ratio D becomes larger than the neutral value, so that oil is supplied to the cylinder 14a to decrease the transmission ratio. When the actual transmission ratio i reaches the desired transmission ratio id, the changing speed (rate) di/dt becomes zero, so that the upshifting operation stops.

As the difference between the desired ratio id and actual ratio i becomes large and the desired transmission ratio changing speed (rate) di/dt becomes large, the duty ratio D for the valve 48 becomes large, thereby increasing the actual transmission ratio changing speed (rate) di/dt.

When the opening degree of the throttle valve is reduced for deceleration, the duty ratio D is reduced along a low engine speed line, thereby draining the cylinder 14a. Thus, the transmission ratio is increased. The transmission ratio changing speed (rate) at downshifting increases with reduction of the duty ratio D.

The control operation of the line pressure will be described hereinafter. From the engine torque table 50, a torque T is obtained in accordance with the throttle opening degree $\theta$ and engine speed $N_e$, which is applied to desired line pressure table 51. The desired line pressure $P_{LD}$ and the maximum line pressure $P_{LM}$ obtained from the table 52 are fed to the reduced line pressure calculator 53. The calculator 53 calculates a reduced line pressure $P_{LR}$. The solenoid operated on-off valve 56 is operated at a duty ratio $D_L$ corresponding to the reduced line pressure $P_{LR}$. The line pressure is applied to cylinder 15a to hold the belt 16 at a necessary minimum force, the transmitting torque at which is slightly larger than torque T. Thus, power is transmitted through the transmission without slipping of the belt.

The operation at the acceleration is further described.

When the kickdown is operated, the desired transmission ratio id quickly becomes large. The actual transmission ratio is controlled to converge toward the desired ratio id at the transmission ratio changing speed (rate) di/dt calculated at the transmission ratio changing speed calculator 45 so that the transmission ratio is quickly increased. Thereafter, the desired ratio id decreases in accordance with the deviation of the actual ratio i from the desired ratio id, so that the transmission ratio is decreased.

Figure 4A:
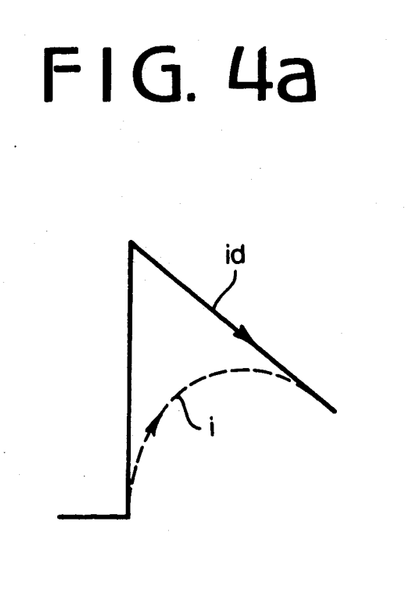
FIGS. 4a to 4c are time charts showing characteristics of the transmission ratio at acceleration.

Referring to FIG. 4a when the desired transmission ratio changing speed (rate) did/dt for decreasing the transmission ratio is large, for example when the vehicle is accelerated on a downhill, the desired ratio id rapidly decreases. At that time, the coefficient K1 is determined as shown at a line a in FIG. 3 in dependency on the difference between the desired ratio id and the actual ratio i calculated at the difference calculator 61. The coefficient K1 reduces as the difference id-i becomes smaller so that the changing speed (rate) di/dt also decreases. Accordingly, the actual transmission ratio i gradually converges to the desired ratio, thereby smoothly decreasing the ratio transmission.

Figure 4B:
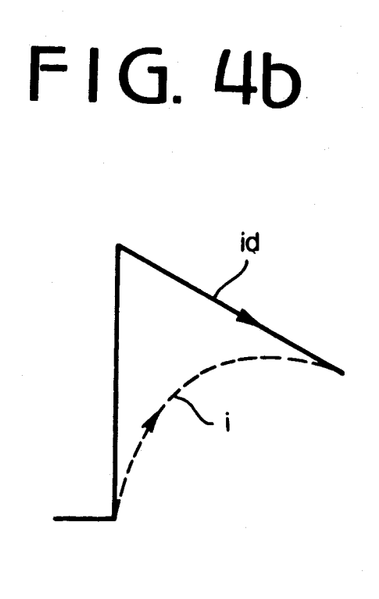

If the desired transmission ratio changing speed (rate) -did/dt is relatively low as shown in FIG. 4b, the coefficient K1 is determined at a line b in FIG. 3, which is larger than at the line a. Thus, the decrease of the changing speed (rate) di/dt is smaller However, since decrease of the desired transmission ratio id is small, the actual transmission ratio i smoothly converges to the desired ratio id as shown in FIG. 4b.

Figure 4C:
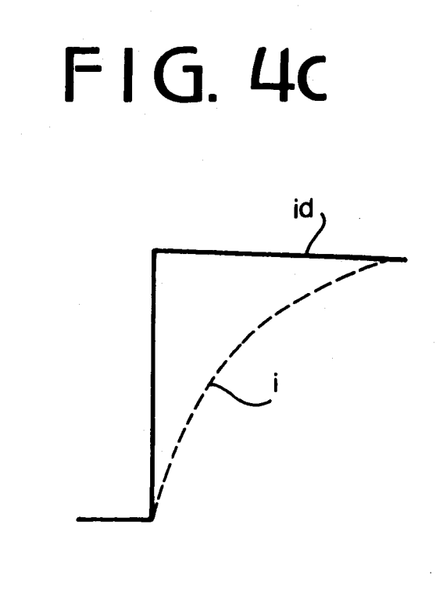

When the desired transmission ratio id is kept substantially constant at a large value as shown in FIG. 4c, the coefficient K1 is determined at a line c, where the coefficient is substantially constant. Therefore, the actual ratio i increases at a constant speed to converge to the desired ratio id. Thus, the transmission ratio is gradually decreased.

In accordance with the present invention, there is provided a control system for a continuously variable transmission wherein the actual transmission ratio smoothly converges to the desired transmission ratio at acceleration without generating shock of acceleration nor control delay.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A control system for a continuously variable transmission for transmitting power of an engine mounted on a motor vehicle, the engine having a throttle valve, the transmission comprising a drive pulley having a hydraulically shiftable disc and a hydraulic cylinder for operating the disc, a driven pulley having a hydraulically shiftable disc and a hydraulic cylinder for operating the disc of the driven pulley, a belt engaged with both pulleys, the control system comprising a first hydraulic circuit having a pump for supplying oil to both the hydraulic cylinders, a transmission ratio control valve for controlling the oil supplied to the cylinder of the drive pulley to change the transmission ratio of the transmission to a desired transmission ratio, the system comprising:

transmission ratio control means for operating the transmission ratio control valve;

a drive pulley speed sensor for producing a drive pulley speed signal;

a driven pulley speed sensor for producing a driven pulley speed signal;

a throttle position sensor for sensing an opening degree of the throttle valve and for producing a throttle opening degree signal;

first calculator means responsive to the drive pulley speed signal and the driven pulley speed signal for producing an actual transmission ratio signal;

means responsive to the throttle opening degree signal and to the actual transmission ratio signal for producing a desired transmission ratio signal;

second calculator means responsive to the desired transmission ratio signal for producing a desired transmission ratio changing speed signal;

third calculator means responsive to the actual transmission ratio signal and the desired transmission ratio signal for calculating a difference between both the ratio signals and for producing a ratio difference signal;

coefficient setting means responsive to the desired transmission ratio changing speed signal and to the ratio difference signal for producing a correcting coefficient;

correcting means responsive to said actual and desired transmission ratio signals for producing an actual transmission ratio changing speed signal using the correcting coefficient; and driving means responsive to the actual transmission ratio changing speed signal for operating the transmission ratio control means for controlling the transmission ratio.

2. The system according to claim 1 wherein the correcting coefficient is an increasing function of the desired transmission ratio changing speed signal and an increasing function of the ratio difference signal.

3. In a control system for a continuously variable transmission for transmitting power of an internal combustion engine mounted on a motor vehicle, said transmission comprising a drive pulley having a first hydraulically shiftable disc and a first hydraulic cylinder for operating said disc, a driven pulley having a second hydraulically shiftable disc and a second hydraulic cylinder for operating said second hydraulically shiftable disc, a belt engaged with said both of said pulleys, the control system comprising a first hydraulic circuit having a pump for supplying oil to both said first and second hydraulic cylinders, a transmission ratio control valve for controlling the oil supplied to said first hydraulic cylinder of said drive pulley to change a transmission ratio of the transmission to a desired transmission ratio, a second hydraulic circuit having a solenoid operated valve for operating said transmission ratio control valve, a driven pulley speed sensor for detecting speed of the driven pulley and for generating a driven pulley speed signal, a throttle position sensor for detecting a position of a throttle valve of the engine, which controls power of said engine, and for producing a throttle position signal, an actual transmission ratio calculator responsive to speed of said drive and driven pulleys for producing an actual transmission ratio signal, and an engine speed sensor for detecting engine speed and for producing an engine speed signal, the improvement in the control system which comprises:

desired transmission ratio calculating means responsive to said driven pulley speed signal and said actual transmission ratio signal for calculating a desired transmission ratio and for producing a desired transmission ratio signal;

a desired transmission ratio changing speed calculator responsive to said desired transmission ratio signal for producing a desired transmission ratio changing speed signal;

ratio difference calculating means responsive to said desired transmission ratio signal and said actual transmission ratio signal for calculating a ratio difference and for generating a ratio difference signal;

a coefficient setting means responsive to said ratio difference signal and to said desired transmission ratio changing speed signal for generating a correcting coefficient in order to correct an actual transmission ratio changing speed and for generating a correcting coefficient signal;

transmission ratio changing speed calculating means responsive to said actual transmission ratio signal, said correcting coefficient signal, said desired transmission ratio signal and said desired transmission ratio changing speed signal for calculating said actual transmission ratio changing speed and for producing an actual transmission ratio changing speed signal; and driving means responsive to said actual transmission ratio signal and said actual transmission ratio changing speed signal for operating said transmission ratio control valve so as to accurately control said actual transmission ratio changing speed in order to smoothly accelerate said motor vehicle when said engine speed suddenly changes.

* * * * *